United States Patent Office 3,631,127
Patented Dec. 28, 1971

3,631,127
POLYMERIZABLE ADDUCT OF CARBOXY CONTAINING COPOLYMER AND MONOESTERS OF DIEPOXIDES AND UNSATURATED MONOCARBOXYLIC ACID WITH VINYL MONOMERS
Shozaburo Nomura and Kiyoshi Honda, Osaka, Mitsumasa Miyazaki, Amagasaki, Kazutoyo Hirose, Tokyo, and Katsuo Akiyama, Kawaguchi, Japan, assignors to Dainippon Ink and Chemicals, Incorporated, Tokyo, and Dainippon Ink Institute of Chemical Research, Kamikizaki, Urawa-shi, Japan
No Drawing. Filed Mar. 16, 1970, Ser. No. 20,081
Claims priority, application Japan, Mar. 22, 1969,
44/21,277
Int. Cl. C08g 45/04
U.S. Cl. 260—837 R    4 Claims

ABSTRACT OF THE DISCLOSURE

A radical-cross-linkable resin composition comprising (A) a modified copolymer whose side chain has been introduced with an active unsaturated bond through the intermediary of at least two epoxy ester bonds, said copolymer having been obtained by adding an unsaturated epoxy resin to a polycarboxy copolymer; and (B) a monomer copolymerizable with the unsaturated bond of the side chain of said modified copolymer, the amount of (B) being at least 5% by weight of (A). This radical-cross-linkable resin composition can form a coating having excellent properties.

This invention relates to radical-cross-linkable resin compositions having an active unsaturated bond in their side chains which, by being readily linked by an active radical, can form a coating having excellent properties.

More particularly, the invention relates to a radical-cross-linkable resin composition comprising (A) a modified copolymer the side chain of which has been introduced with an active unsaturated bond through the intermediary of at least two epoxy ester bonds, said copolymer having been obtained by adding an unsaturated epoxy resin (a) derived from 2 equivalents (calculated as epoxy equivalents) of a polyepoxy resin having epoxy groups at both ends of its molecule and 0.6–1.5 equivalents (calculated as carboxylic acid equivalents) of a monovalent unsaturated carboxylic acid; to a polycarboxy copolymer (b) consisting of 3–30 parts by weight of a polymerizable monomer having a carboxyl group and 97–79 parts by weight of a monomer copolymerizable therewith, in a proportion of 0.1–3 equivalents (calculated as unsaturated bond equivalents) of (a) per 1000 parts by weight of (b); and (B) a monomer copolymerizable with the unsaturated bond of the side chain of said modified copolymer, the amount of (B) being at least 5% by weight of (A). A particular feature of the present invention resides in the fact that it can form a coating possessing excellent properties at low temperatures and in a very short period of time when carrying out the radiation link cure method, using an accelerated electronic beam as the radical generating source.

As radiation cured type coatings, there is one, as disclosed, for example, in Belgian Pat. No. 693,268, which does not make conjoint use of an epoxy resin but is one which has introduced an active unsaturated bond to the side chain of a glycidyl methacrylate copolymer by merely reacting methacrylic acid therewith. This, however, still had drawbacks in such as especially its adhesiveness and resistance to corrosion. Again, it has been the practice in the past to make conjoint use of a polyepoxy compound in the case of the heat-curable type of coatings to obtain resin compositions which can form coatings excelling in their adhesiveness to metallic materials and resistance to corrosion and attack by chemicals. However, in the case of the radical-cross-linked type of resin compositions, especially as in the radiation cure method where a heat treatment is not carried out but is characterized in that the cure is accomplished at low temperatures and a very short period of time by means of only the radical addition polymerization mechanism without the accompaniment of a condensation reaction, there was a major shortcoming that by the mere conjoint use of a polyepoxy compound as in the conventional thermosetting resin compositions not only was it impossible to expect an improvement in the properties of the coating but, on the contrary, the radical-cross-linking reaction was impeded to result in the cure not being carried out adequately.

As a consequence of our assiduous researches with a view to improving on this shortcoming we found that by the introduction into the main chain polymer an active unsaturated bond through the intermediary of at least two epoxy esters, we found that a coating further improved in such properties as superior adhesiveness to metals and resistances to corrosion and attack by chemicals, i.e. the advantages obtained by epoxy modification, could be obtained without any hindrance to the radical-cross-linking reaction as in the case where the mere joint use is made of the polyepoxy compound. Thus, the present invention was perfected.

As the main chain copolymer to be used in the present invention, suitably used is the polycarboxy compound (b) which is obtained by copolymerizing 3–30 parts by weigh, and preferably 5–20 parts by weight (hereinafter, unless otherwise specified, the parts and percentages are on a weight basis) of a copolymerizable unsaturated monomer having a carboxyl group with 70–97 parts, and preferably 80–95 parts, of an unsaturated monomer copolymerizable therewith. If the copolymerizable unsaturated monomer having a carboxyl group is less than 3 parts in this case, the carboxyl group concentration is lowered, with the consequence that the modification reaction by means of the unsaturated epoxy resin does not readily proceed. On the other hand, when the copolymerizable unsaturated monomer having a carboxyl group exceeds 30 parts, an excess of the free carboxyl groups become present to result in the deterioration of the coating properties.

The resin composition of the present invention is obtained by adding to 1000 parts of the aforesaid polycarboxy copolymer (b) an unsaturated epoxy resin (a) having one epoxy group and at least one polymerizable unsaturated bond in its molecules, the addition being made at the rate of 0.1–3, and preferably 0.2–2 unsaturated bond equivalents, to obtain a modified copolymer (A) whose side chain has been introduced with an active unsaturated bond through the intermediary of an epoxy ester bond, and thereafter blending with the aforesaid copolymer (A) of a monomer (B) having an unsaturated bond copolymerizable with the aforesaid side chain in an amount of at least 5% based on the solids content of the modified copolymer (A).

When the aforesaid unsaturated epoxy resin (a) is not present based on 1000 parts of the aforesaid polycarboxy copolymer (b) in an amount of above 0.1 equivalent calculated as the unsaturated bond equivalent of (a), the cross-linking density of the polymer becomes inadequate and the adhesiveness of the coating as well as its resistance to chemicals and solvents suffers. On the other hand, when the unsaturated epoxy resin (a) is present in a large amount, i.e. in excess of 3 equivalents, not only a marked increase in the viscosity takes place but also the solubility of the composition becomes poor, with the consequence that it becomes unsuitable for coating purposes.

As the copolymerizable unsaturated monomer having a carboxyl group, the monomer to be used in the synthesis of the polycarboxy copolymer (b), mention can be made of the alpha, beta-unsaturated carboxylic acids such as acrylic acid, methacrylic acid, itaconic acid, maleic acid and fumaric acid. On the other hand, as the unsaturated monomers copolymerizable with the foregoing unsaturated monomer having a carboxyl group, useable are the copolymerizable unsaturated aromatic compounds such as styrene, alpha-methyl styrene and vinyl toluene; the vinyl esters such as vinyl acetate, vinyl propionate or vinyl versatate sold under the trademark of "Veo Va"; the substituted, unsubstituted aliphatic alicyclic or aromatic esters of the alpha, beta-unsaturated carboxylic acids, such as ethyl acrylate, butyl acrylate, 2-ethylhexyl acrylate, methyl methacrylate, ethyl methacrylate, butyl methacrylate, octyl methacrylate, isobutyl acrylate, methyl acrylate, isobutyl methacrylate, lauryl methacrylate, benzyl acrylate, benzyl methacrylate, cyclohexyl acrylate, cyclohexyl methacrylate, phenyl methacrylate, diethyl itaconate, diactyl itaconate, dimethyl fumarate, diethyl fumarate, dibutyl fumarate, dimethyl maleate and dibutyl maleate; the alpha, beta-unsaturated carboxylic acid monoesters of polyhydric alcohols, such as 2-hydroxypropyl acrylate and 2-hydroxypropyl methacrylate; tetrahydrofurfuryl acrylate, tetrahydrofurfuryl methacrylate, acrylonitrile, methacrylonitrile, acrylamide, methacrylamide, methylolated acrylamide, N-methoxymethylated acrylamide; vinyl pyrrolidone, vinyl imidazole, vinyl chloride and vinylidene chloride. These may be used singly or in optional combinations of two or more classes.

The unsaturated epoxy resins (a) which are used for the modification of the polycarboxy copolymers (b) include that obtained by mixing for example, either (i) in diglycidyl ethers of 2-bis(4-hydroxyphenyl)-propane, which are sold under the trademark of "Epilote"; (ii) the di-2-methyl glycidyl ether of 2-bis(4-hydroxyphenyl)-propane sold under the trademark of "Epiclon," or the condensation products thereof, i.e. the polyepoxy ethers of the following structure, which are polyepoxy resins having epoxy groups at both ends their molecules.

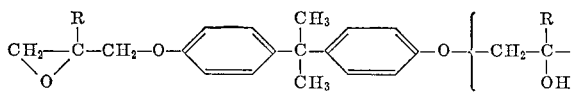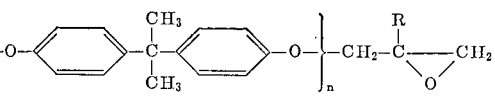

wherein R is hydrogen or methyl group and $n$ is either 0, 1, 2, 3 or 4; or (iii) the epoxy esters having epoxy groups at both ends of their molecules obtained by reacting the aforesaid polyepoxy ether with a divalent carboxylic acid; with a mono unsaturated carboxylic acid in a proportion of 2 equivalents (calculated as epoxy equivalents) of the former to 0.6–1.5 equivalents, and preferably 0.8–1.2 equivalents (calculated as carboxylic acid equivalents) of the latter and then reacted with heating at 50–150° C., and preferably 80–130° C. If necessary, solvents such as ketones, esters or aromatic hydrocarbons may be used singly or as mixtures in optional proportions at the rate of 20–100 parts per 100 parts of resin solids content. Further, if necessary, a catalyst system containing a nitrogenous compound such as triethylamine or tributylamine can also be used.

The mono unsaturated carboxylic acid used in this case include acrylic acid, methacrylic acid, the acrylic acid derivatives such as alpha-chloroacrylic acid or alpha-cyanoacrylic acid; crotonic acid, oleic acid, linolic acid, linolenic acid or ricinoleic acid, which may be used ether singly or in combinations of two or more classes.

On the other hand, as the divalent carboxylic acids, such acids as succinic, adipic, fumaric, maleic, phthalic and isophthalic acids are convenient.

Further, as previously indicated above, the proportion in which the foregoing monovalent unsaturated carboxylic acid (calculated as carboxylic acid equivalents) is used to the 2 equivalents of the aforesaid polyepoxy ethers and/or polyepoxy esters (calculated as epoxy equivalents) is conveniently 0.6–1.5 equivalents, and preferably 0.8–1.2 equivalents.

Now, when this proportion is less than the values hereinabove indicated, the difunctional epoxy component becomes left over in excess which results in formation of gels during the preparation of the subsequently following modified copolymer (A). On the other hand, when the foregoing proportion is exceeded, the resulting resin suffers in its surface curability. Hence, it is necessary to keep the proportion used of the components within the hereinabove specified range.

The monomer (B) of the invention composition includes the unsaturated monomers which are copolymerizable with the copolymerizable unsaturated monomers having a carboxyl group that were used in the synthesis of the aforesaid polycarboxy copolymers and, in addition, the polyesters of polyhydric alcohols and acrylic or methacrylic acid, such as ethylene glycol diacrylate, ethylene glycol dimethacrylate, propylene glycol dimethacrylate, dimethylolethane triacrylate, dimethylolethane trimethacrylate and trimethylolpropane polymethacrylate, or the chain or cyclic compounds having two or more unsaturated bonds in a single molecule, such as divinylbenzene, triaryl cyanurate or diaryl phthalate. These may be used either singly or in combinations of two or more classes, chosen optionally, in accordance with the purpose intended.

When the content of the foregoing monomer (B) relative to the solids content of the aforesaid modified copolymer (A) is less than 5%, adverse effects are had during the cross-linking reaction using the invention composition. That is to say, the plasticizing effect of the solvent is great, for example, with the consequence that the surface remains tacky. Hence, a value of at least 5% should be maintained. And, for those purposes in which it is required to exclude the possibility of adverse effects to the utmost, particularly preferred is the use of the monomer (B) in an amount exceeding 30%. The upper limit should for economic reasons be set at 400 weight percent at most.

The conditions for synthesizing the resin compositions of the present invention, if more fully described, are generally as follows:

(1) Synthesis of the polycarboxy copolymer (b)

While as the method of synthesis any of known polymerization methods, i.e., emulsion, bulk, dispersion or solution polymerization technique, may be used, the solution polymerization method which has the advantage that the resulting product can be directly used in the step of modifying the polycarboxy copolymer (b) by means of the unsaturated epoxy resin (a) will be described.

3–30 parts, and preferably 5–20 parts, of a copolymerizable unsaturated monomer having a carboxyl group and 70–97 parts, and preferably 80–95 parts, of an unsaturated monomer copolymerizable therewith are polymerized at 50–150° C., and preferably 80–130° C. using 20–100 parts, and preferably 30–50 parts, of a solvent such as a ketone, an ester, an aromatic hydrocarbon or an alcohol in the presence of 0.3–5 parts, and preferably 0.5–2 parts, of a known radical polymerization initiator such as benzoyl peroxide, tertiary butyl perbenzoate, cumene hydroperoxide or azobisisobutyronitrile by a procedure of polymerization in which the reactants are either charged all at once or added dropwise to obtain a polycarboxy copolymer (b) solution.

(2) Modification by means of the unsaturated epoxy resin (a)

The unsaturated epoxy resin (a) is mixed with the polycarboxy copolymer (b) solution obtained in (1), above, in a proportion of 0.1–3, and preferably 0.2–2, calculated as unsaturated bond equivalents, based on 1000 parts of the resin content of the copolymer (b) solution. The reaction is then carried out in accordance with the conditions of synthesis of the foregoing unsaturated epoxy resin (a), using, if necessary, a polymerization inhibitor such as hydroquinone. Thus, a solution of modified copolymer (A) whose side chain has been introduced with an active unsaturated bond is obtained.

(3) Preparation of the invention resin composition

A monomer (B) copolymerizable with the unsaturated bond of the side chain of the modified copolymer (A) obtained in (2), above, is mixed with a solution of said modified copolymer (A) in an amount of at least 5%, and preferably at least 30%, based on the resin solids content of the modified copolymer (A) followed, if necessary, by the addition of a polymerization inhibitor such as hydroquinone or catechol. A homogeneous dissolution of the monomer (B) in the solution is then effected with thorough stirring to obtain the invention resin composition.

In actually using the invention resin composition obtained as hereinabove described, it is either used in its as-obtained state or with the incorporation of inert additives such as fillers and various colorants as pigments to meet the purpose for which it is intended. Application is made to the object to be coated by such known methods as spraying, dipping or roller coating technique, after which the coating is cured either by subjecting it to an ionizing radiation by means of beta rays, gamma rays or an accelerated electronic beam or by using an oxidation-reduction catalyst systems such as the cobalt-methyl ethyl ketone-peroxide system or the dimethylaniline-benzoyl peroxide system. Commercially the use of the accelerated electron beam is especially advantageous. Conveniently used being the electron beam curing method which uses an accelerator of a voltage 0.1–2 mev. and capacity 0.02–200 ma.

There is imposed no restriction as to the objects to be applied the resin compositions of the present invention. It is, however, particularly suitable for coating metallic materials, slates, wood, plastic materials, papers and films, the adhesiveness to metallic materials being outstanding.

For a better understanding of the invention, the following non-limitative examples are given. In the examples the parts and percentages, unless otherwise specified, are on a weight basis.

EXAMPLE 1

A mixture consisting of 50 parts of methyl methacrylate, 40 parts of ethyl acrylate, 10 parts of methacrylic acid and 1 part of azobisisobutyronitrile was polymerized by being adde dropwise at 100° C. over a period of 2 hours to a solvent mixture consisting of 25 parts of xylol and 25 parts of butyl acetate to obtain a polycarboxy copolymer solution. This solution is designated (A–1).

In a separate reaction vessel 180 parts (1 equivalent) of an epoxy resin of epoxy equivalent 180 obtained by the condensation reaction at 50–100° C. of 2-bis(4-hydroxyphenyl) propane and epichlorohydrin in a mole ratio of 1:2 in the presence of an alkali catalyst, 30 parts (0.35 equivalent) of methacrylic acid, 90 parts of methyl methacrylate, 0.1 part of hydroquinone and 0.3 part of tributylamine were reacted at 100° C. until the acid value became less than 1 to obtain an unsaturated epoxy resin composition. The so obtained resin composition is designated (B–1).

In 150 parts (equal to 100 parts as solids) of the hereinbefore described solution (A–1) were mixed 10 parts (calculated as unsaturated bond equivalent about 0.012) of the hereinbefore described resin composition (B–1) followed by the addition of 0.3 part of tributylamine. The mixture was reacted at 100° C. until the acid value became constant, after which it was diluted by the addition of 25 parts of methyl methacrylate and 5 parts of isobutyl methacrylate. The so obtained resin composition was applied to a steel plate (coating thickness 30 microns) and then irradiated in air at room temperature at a dosage of 5 mrads. using a 300 Kev. electron beam accelerator. The so irradiated coating demonstrated excellent properties. The test results of the coating properties are shown in Table 1.

EXAMPLE II

A mixture consisting of 30 parts of styrene, 30 parts of isobutyl methacrylate, 25 parts of isobutyl acrylate, 11 parts of 2-hydroxyethyl acrylate and 4 parts of itaconic acid was dissolved in a solvent mixture consisting of 30 parts of toluol and 70 parts of methyl isobutyl ketone followed by the addition of 1 part of azobisisobutyronitrile to the solution. The copolymerization reaction was then carried out under identical conditions as in Example I to obtain a polycarboxy copolymer solution. This solution is designated (A–2).

In a separate reactor a mixture consisting of 450 parts (1 equivalent of an epoxy resin of epoxy equivalent) 450 synthesized from 3 mols of 2-bis(4-hydroxyphenyl)-propane and 4 mols of epichlorohydrin in the presence of an alkali catalyst at 50–100° C., 36 parts (0.5 equivalent) of acrylic acid, 60 parts of xylol, 54 parts of Cellosolve acetate, 0.1 part of hydroquinone and 0.5 part of tributylamine was reacted with heating at 120° C., the reaction of the foregoing acrylic acid and the epoxy group present in the foregoing epoxy resin being continued until the acid value became less than 1 to obtain an unsaturated epoxy resin composition. This resin composition is designated (B–2).

The aforesaid solution (A–2) in an amount of 200 parts (solids content 100 parts) were mixed with 60 parts (calculated an unsaturated bond equivalent 0.05) of the aforesaid resin composition (B–2) followed by mixing therein of 0.3 parts of tributylamine. The mixture was then reacted at 120° C. until the acid value became constant, after which it was diluted with 30 parts of cyclohexyl methacrylate and 10 parts of ethylene glycol dimethacrylate. The resulting resin composition was applied to a steel plate with a bar coater to a coating thickness of 30 microns, following which the coating was subjected to an ionizing radiation of 3 mrads using a 300 kev electron beam accelerator to form a cured coating having excellent properties. The test results of the coating properties are shown in Table 1.

EXAMPLE III

Forty parts of styrene, 40 parts of butyl acrylate, 10 parts of acrylic acid and 10 parts of methacrylic acid were copolymerized as in Example II to obtain a polycarboxy copolymer solution. This solution is designated (A–3).

Next, in a separate reactor 250 parts (about 1 equivalent) of an epoxy resin of epoxy equivalent 280 obtained by reacting 2-bis(4-hydroxyphenyl) propane and epichlorohydrin in a mole ratio of 2:3 and 51 parts (about 0.6 equivalent) of methacrylic acid were reacted under identical conditions as in Example II to obtain an unsaturated epoxy resin composition. This is designated resin composition (B–3).

200 parts (solids content 100 parts) of the solution (A–3) and 125 parts (0.2 equivalent) of the resin composition (B–3) were similarly reacted to obtain a modified copolymed solution, which was diluted with 20 parts of ethylene glycol diacrylate and 20 parts of isobutyl acrylate. A coating of this modified copolymer solution by being treated as in Example II formed a satisfactory cured coating on a steel plate. The test results of the coating properties are shown in Table 1.

EXAMPLE IV

Thirty parts of methyl methacrylate, 30 parts of vinyl acetate, 25 parts of tetrahydrofurfuryl acrylate and 15 parts of acrylic acid were copolymerized as in Example I to obtain a polycarboxy copolymer solution (designated A–4).

In a separate reactor 200 parts (1 equivalent) of an epoxy resin of epoxy equivalent 200 obtained by reacting 2-bis(4 - hydroxyphenyl) propane and 2 - methyl epichlorohydrin in a mole ratio of 1:2 in the presence of an alkali catalyst at 50–100° C. and 52 parts of methacrylic acid were treated by the same procedure and conditions of synthesis as in the case of (B–1) in Example I to obtain an unsaturated epoxy resin composition (designated B–4).

150 parts (solids content 100 parts) of the hereinbefore described solution (A–4) and 120 parts of the resin composition (B–4) were reacted under identical conditions as in Example I to obtain a resin composition having an active unsaturated bond in its side chain. The so obtained resin composition was diluted with a mixture consisting of 100 parts of methyl methacrylate and 100 parts of isobutyl methacrylate and then applied to a steel plate followed by subjecting the coating to an ionizing radiation of 5 mrads. using a 500 kev. electron beam accelerator. The so obtained coating demonstrated excellent properties. The test results of the coating properties are shown in Table 1.

EXAMPLE V

Forty-two parts of ethyl acrylate, 30 parts of styrene and 28 parts of acrylic acid were copolymerized as in Example I to obtain a polycarboxy copolymer solution (designated A–5).

On the other hand, 2-bis(4-hydroxyphenyl) propane and 2-methyl epichlorohydrin in a mole ratio of 1:2 were reacted at a temperature of 50–100° C. in the presence of an alkali catalyst to yield an epoxy resin of epoxy equivalent 200. Next, this epoxy resin and isophthalic acid were reacted in a mole ratio of 2:1 to obtain a resin composition having an epoxy ester bond in its molecule at an epoxy equivalent of 450. This resin composition in an amount of 450 parts (1 equivalent) and 36 parts (0.5 equivalent) of acrylic acid, along with 100 parts of Cellosolve methacrylate, 100 parts of tetrahydrofurfuryl methacrylate, 5 parts of hydroquinone and 1 part of tributylamine were reacted at 100° C. until the acid value became less than 1 to obtain an unsaturated epoxy resin composition (designated B–5).

150 parts (solids content 100 parts) of the foregoing (A–5) and 420 parts (0.3 equivalent) of the foregoing (B–5) were reacted as in Example I followed by diluting the resulting resin composition with 230 parts of methyl methacrylate. This composition was applied to a steel plate and treated as in Example IV. The cured coating demonstrated satisfactory properties. The test results of the properties of the coating are shown in Table 1.

EXAMPLE VI 500 parts (1 equivalent) of an epoxy resin of epoxy equivalent 470 obtained by reacting 2-bis(4-hydroxyphenyl) propane and 2-methyl epichlorohydrin in a mole ratio of 3:4 along with 112 parts (0.4 equivalent) of dehydrated castor oil fatty acids (a mixture of linolic and oleic acids), 0.5 part of 2-methyl imidazole and 154 parts of methyl isobutyl ketone were reacted at 120° C. until the acid value became less than 2 to obtain an unsaturated epoxy resin composition (designated B–6).

150 parts (solids content 100 parts) of (A–1) of Example I, 10 parts (unsaturated bond equivalent 0.012) of (B–1) of Example I and 77 parts (unsaturated bond equivalent 0.08) of the foregoing (B–6) were reacted at 120° C. in the presence of 0.2 part of 2-methyl imidazole until the acid value became constant.

The so obtained modified copolymer solution was diluted by the addition of 60 parts of isobutyl methacrylate and 20 parts of 2-ethoxyethyl methacrylate, following which this solution was applied to a steel plate and treated as in Example IV to form a cured coating on the steel plate.

EXAMPLE VII

An epoxy resin having an epoxy equivalent of 470 was prepared by reacting 2-bis(4-hydroxyphenyl) propane and 2-methyl epichlorohydrin in a mole ratio of 3:4. The so obtained epoxy resin was then reacted with isophthalic acid in a mole ratio of 2:1 to obtain at an epoxy equivalent of 900 a polyepoxy resin having an epoxy ester bond in its molecule. A liquid mixture of 90 parts (0.1 equivalent) of this polyepoxy resin, 3 parts (0.04 equivalent) of acrylic acid, 40 parts of methyl isobutyl ketone, 0.1 part of 2-methyl imidazole and 0.01 part of hydroquinone was heated at 100° C. and reacted until the acid value became less than 1. Thus was obtained an unsaturated epoxy resin composition (designated B–7).

Next, 200 parts (solids content 100 parts) of the solution obtained in Example II and 133 parts (unsaturated bond equivalent 0.04 of the foregoing (B–7) were reacted along with 0.2 part of hydroquinone and 0.3 part of tributylamine at 100° C. until the acid value became constant. Thus was obtained a solution of modified copolymer whose side chain was introduced with an active unsaturated bond.

A liquid mixture consisting of 10 parts of 2-hydroxyethyl methacrylate, 10 parts of trimethylolpropane dimethacrylate and 33 parts of methacrylic acid was added to the so obtained modified copolymer solution to obtain a resin composition which was applied to a steel plate and treated as in Example II to form a cured coating on the steel plate.

The test results of the properties of the coating are shown in Table 1.

EXAMPLE VIII

A blue enamel was prepared by kneading together 200 parts of the resin composition having an active unsaturated bond in its side chain (obtained in Example II), 63 parts of rutile type titanium dioxide and 4 parts of Pathalocyanin Blue, followed by adjusting the viscosity to a consistency suitable for painting by the addition of isobutylmethacrylate. The so prepared enamel was applied to a steel plate and treated as in Example II. The coating obtained exhibited excellent properties. In Table 1 are shown the test results of the properties of this coating.

EXAMPLE IX

A gray enamel was prepared from 120 parts of the resin composition obtained in Example I by kneading therewith 39.8 parts of rutile type titanium dioxide and 0.2 part of carbon black. This enamel was treated as in Example VIII and a coating having excellent properties was formed on a steel plate. The test results are shown in Table 1.

Control I 150 parts (solids content 100 parts) of the polycarboxy copolymer solution (A–1) obtained in Example I and 13 parts (0.9 equivalent) of glycidyl acrylate were reacted under identical conditions as in Example VI using the same catalyst as used therein and in the same amount. The resulting resin was diluted with methyl methacrylate to a content of the non-volatile constituent of 50%. This was then applied as in Example VI to a steel plate and the coating was subjected to irradiation by means of an electron beam. The resistance to solvents and the adhesiveness of this coating was exceedingly poor.

Control II

An epoxy resin of an epoxy equivalent of 200 obtained by reacting 2-bis(4-hydroxyphenyl) propane and 2-methyl

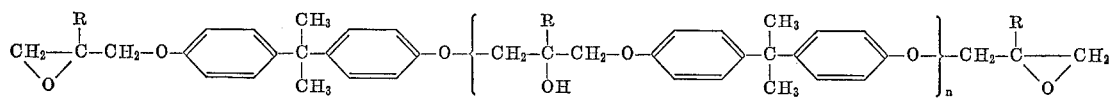

epichlorohydrin in a mole ratio of 1:2 at 50–100° C. was incorporated in the methyl methacrylate-diluted solution of resin obtained in Control I in an amount of 15% based on the diluted solution to prepare a coating solution. The so obtained solution was applied to a steel plate and treated by irradiation with an accelerated electron beam as in Example VI. In this case, the coating could not be adequately cured, and the surface of the coating remained tacky.

TABLE 1

|  | Experiments | | | | | |
| --- | --- | --- | --- | --- | --- | --- |
|  | Pencil hardness (Luster) | Adhesiveness (cross cut test) | Resistance to solvents (24 hrs. in toluene) | Resistance to acids (24 hrs. in aq. 5% HCl) | Resistance to alkalis (24 hrs. in aq. 5% NaOH) | Resistance to salt spray (72 hrs.) |
| Example: | | | | | | |
| I | H-2H | ○ | ○ | ⊚ | ⊚ | ○ |
| II | H-2H | ⊚ | ⊚ | ⊚ | ⊚ | ⊚ |
| III | 2H | ⊚ | ⊚ | ⊚ | ○ | ⊚ |
| IV | H | ⊚ | ⊚ | ⊚ | ⊚ | ⊚ |
| V | H-2H | ⊚ | ⊚ | ⊚ | ⊚ | ⊚ |
| VI | F-H | ⊚ | ○ | ⊚ | ⊚ | ⊚ |
| VII | H | ⊚ | ⊚ | ⊚ | ⊚ | ⊚ |
| VIII | 2H-3H (90) | ○ | ○ | ⊚ | ⊚ | ○ |
| IX | 2H-3H (92) | ○ | ○ | ⊚ | ⊚ | ○ |
| Control: | | | | | | |
| I | F-H | X | △ | ⊚ | ○ | X |
| II | 4B | X | △ | ○ | △ | X |

NOTE: Basis of evaluation: ⊚—No change whatsoever; ○—Slight change; △—Considerable change; X—Pronounced change; retention of the original state of coating practically impossible.

We claim:
1. A radical cross-linkable resin composition comprising
(A) a modified copolymer whose side chain has been introduced with an active unsaturated bond through the intermediary of at least two epoxy ester bonds, said copolymer having been obtained by adding an unsaturated epoxy resin (a) derived from 2 equivalents (calculated as epoxy equivalents) of a polyglycidyl ether of a polyhydric phenol having epoxy groups at both ends of its molecule and 0.6–1.5 equivalents (calculated as carboxylic acid equivalents) of monovalent unsaturated carboxylic acid; to a polycarboxy copolymer (b) consisting of 3–30 parts by weight of a polymerizable monomer having a carboxyl group and 97–30 parts by weight of a monomer free of carboxyl groups and copolymerizable therewith, in a proportion of 0.1–3 equivalents (calculated as unsaturated bond equivalents) of (a) per 1000 parts by weight of (b); and
(B) a monomer copolymerizable with the unsaturated bond of the side chain of said modified copolymer, the amount of (B) being at least 5% by weight of (A).

2. The resin composition of claim 1 wherein said polyglycidyl ether of a polyhydric phenol is a polyepoxy ether having the following structure:

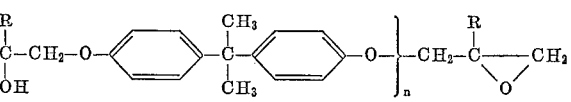

wherein R is selected from the group consisting of hydrogen and methyl and $n$ is a number selected from 0, 1, 2, 3 and 4.

3. The resin composition of claim 1 wherein said polyglycidyl ether of a polyhydric phenol is an epoxy ester obtained by reacting a divalent carboxylic acid with a polyepoxy ether having the following structure:

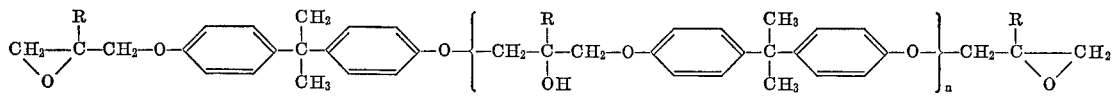

wherein R is selected from the group consisting of hydrogen and methyl group, and $n$ is a number selected from 0, 1, 2, 3 and 4.

4. The resin composition of claim 1 wherein said polyglycidyl ether of a polyhydric phenol is a mixture of a polyepoxy ether having the following structure:

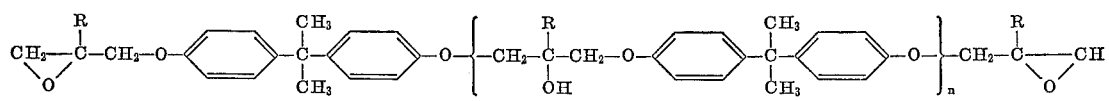

wherein R is selected from the group consisting of hydrogen and methyl and $n$ is a number selected from 0, 1, 2, 3 and 4, and an epoxy ester obtained by reacting a divalent carboxylic acid with said polyepoxy ester.

References Cited

UNITED STATES PATENTS

| | | | |
|---|---|---|---|
| 3,301,743 | 1/1967 | Fekete | 260—837 |
| 3,420,914 | 1/1969 | May | 260—837 |
| 3,535,403 | 10/1970 | Holub | 260—837 |

PAUL LIEBERMAN, Primary Examiner

U.S. Cl. X.R.

260—23 EP, 37 EP, 41 B, 47 EA, 78.5 R, 836; 117—121, 132 BE, 132 C, 138.8 A, 148, 155 UA, 161 ZB, 161 UT

S-467

UNITED STATES PATENT OFFICE
CERTIFICATE OF CORRECTION

Patent No. 3,631,127   Dated December 28, 1971

Inventor(s) SHOZABURO NOMURA ET AL

It is certified that error appears in the above-identified patent and that said Letters Patent are hereby corrected as shown below:

Claim 4, in the structural formula correct the terminal group to read as follows:

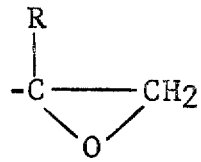

Signed and sealed this 25th day of April 1972.

(SEAL)
Attest:

EDWARD M. FLETCHER, JR.　　　ROBERT GOTTSCHALK
Attesting Officer　　　　　　Commissioner of Patents